May 5, 1964
R. R. MANDY
3,131,411
WINDSHIELD CLEARING SYSTEM
Filed Oct. 5, 1961
2 Sheets-Sheet 1
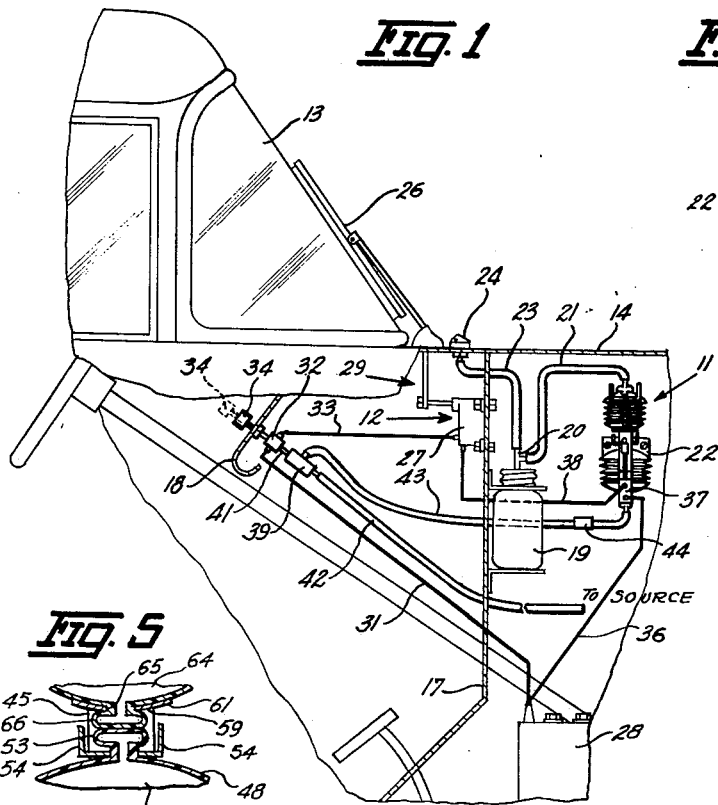
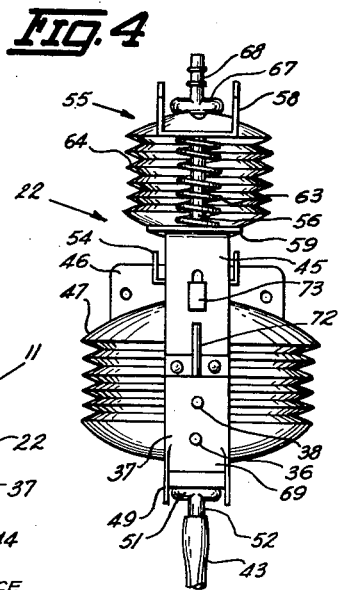
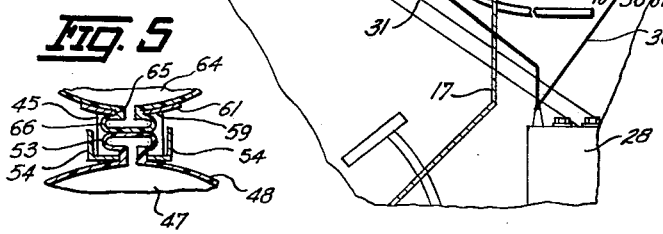
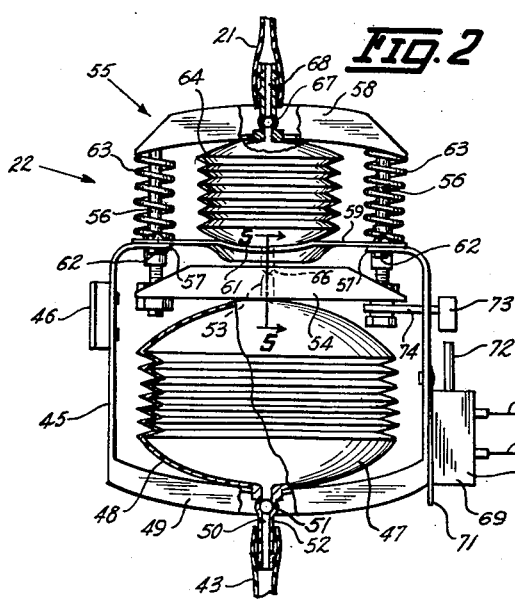
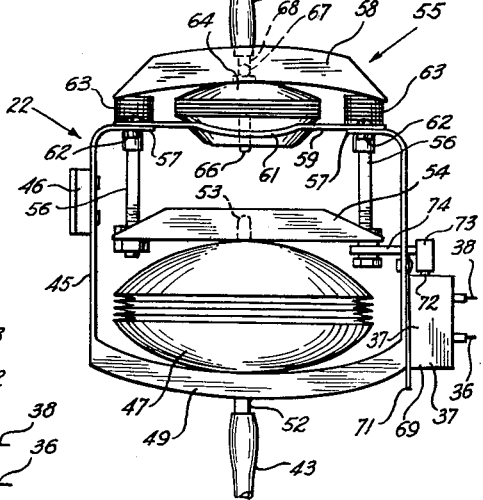
INVENTOR.
ROBERT R. MANDY
BY Lowell & Henderson
ATTORNEYS.

May 5, 1964   R. R. MANDY   3,131,411
WINDSHIELD CLEARING SYSTEM
Filed Oct. 5, 1961   2 Sheets-Sheet 2
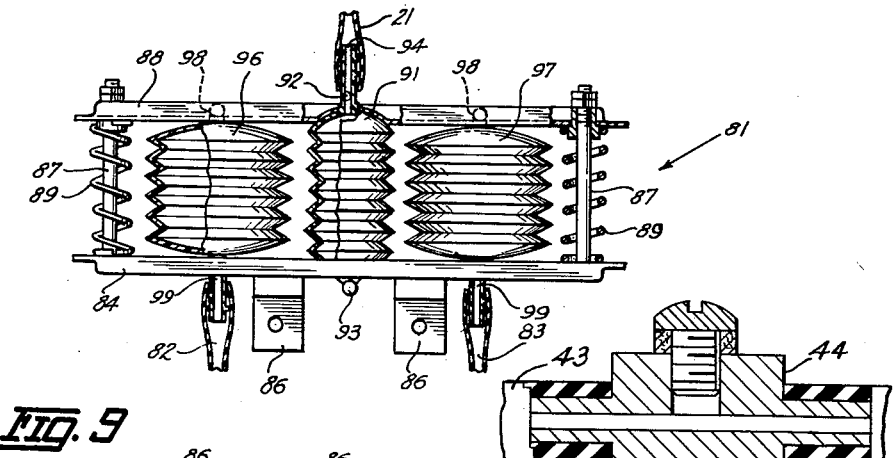
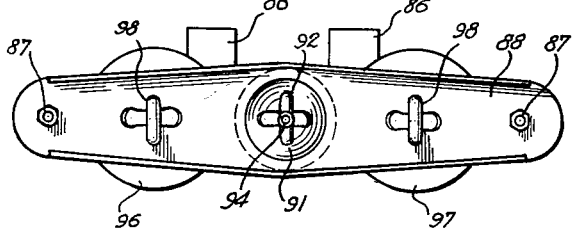
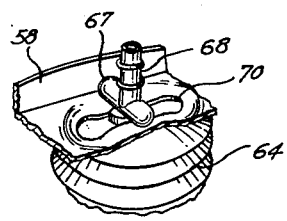
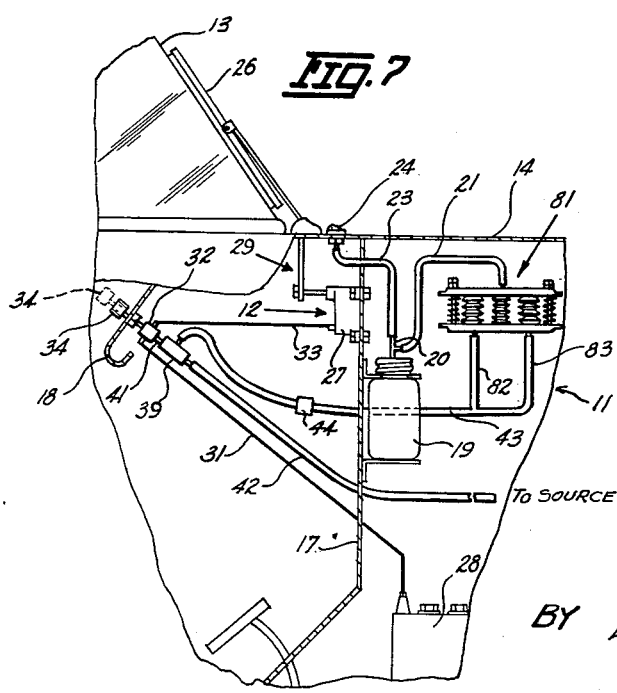
INVENTOR.
ROBERT R. MANDY
BY Lowell + Henderson
ATTORNEYS.

United States Patent Office 3,131,411
Patented May 5, 1964

3,131,411
WINDSHIELD CLEARING SYSTEM
Robert R. Mandy, Detroit, Mich., assignor to Delman Company, Cookeville, Tenn., a corporation of Tennessee
Filed Oct. 5, 1961, Ser. No. 143,109
6 Claims. (Cl. 15—250.02)

This invention relates generally to a windshield clearing system for vehicles and more particularly to a vacuum actuated pump unit of the system.

An object of this invention is to provide a novel vacuum actuated pump unit for a vehicle windshield clearing system.

Another object of this invention is to provide means for operating the wiper unit in response to operation of the pump unit of the washer unit to assure oscillation of the wiper blade when fluid is discharged against the windshield.

A further object of this invention is to provide a vacuum actuated pump unit wherein actuation of the pump unit results in operation of the wiper unit, and wherein time delay means are incorporated with the pump unit for automatically maintaining operation of the wiper unit for a predetermined time period after the pump unit has stopped discharging fluid, and then arresting the wiper unit operation.

Another object of this invention is to provide a vacuum actuated pump unit for discharging a measured quantity of fluid against the windshield, and wherein the fluid and vacuum systems are completely separated thus eliminating the need for seals and close machining tolerances, and obviating the possibility of leakage between the two systems.

Yet another object of this invention is the provision of structure capable of attaining the above mentioned objectives which is economical to manufacture, simple of construction, and effective in operation.

These objects and other features and advantages of this invention will become readily apparent from the following description when taken in conjunction with the accompanying drawings, wherein:

FIG. 1 is a fragmentary side elevational view of a vehicle showing the invention in assembly relation therewith;

FIG. 2 is an enlarged elevational view of a pump unit for the washer unit of the invention, certain parts broken away and others shown in section for clarity;

FIG. 3 is a view similar to FIG. 2 showing the pump unit in an operative position;

FIG. 4 is a front elevational view of the pump unit;

FIG. 5 is an enlarged sectional view taken along the line 5—5 in FIG. 2;

FIG. 6 is an enlarged fragmentary perspective view of a detail of the pump unit;

FIG. 7 is a fragmentary side elevational view of a vehicle showing a modified pump in assembly relation therewith;

FIG. 8 is an enlarged front elevational view of the pump unit of FIG. 7;

FIG. 9 is a plan view of the top of the pump unit of FIG. 8; and

FIG. 10 is an enlarged longitudinal cross sectional view of the bleed valve as shown in FIGS. 1 and 7.

With reference to the drawing and particularly to FIGS. 1–6, inclusive, a vehicle windshield clearing system is disclosed which includes a washer system and a wiper system designated generally in FIG. 1 at 11 and 12, respectively. The vehicle is illustrated as having a windshield 13, an engine cowl 14 extended forwardly of the windshield, a fire wall 17 and a dashboard 18.

The washer system 11 includes a fluid reservoir 19 mounted on the fire wall 17 for supplying fluid through a three-way valve 20 and a conduit 21 to a vacuum operated fluid pump unit 22. The pump unit 22, upon operation, withdraws fluid from the reservoir 19 and expels the fluid through another conduit 23 to one or more nozzles 24. Each nozzle 24 is mounted on the cowl 14 at a position forwardly of the windshield 13, and is adapted to discharge the fluid upwardly onto the windshield and into the path of movement of a windshield wiper blade 26, which forms a part of the wiper system 12.

The wiper system 12 also includes an electric wiper motor 27 of a conventional type which is mounted on the fire wall 17, and which is energized by a battery 28 to drive the wiper blade 26 in an oscillating manner across the windshield 13 by means of the usual transmission mechanism indicated generally at 29 (FIG. 1). The battery 28 is connected in an electric circuit which includes a lead 31 to an on-off rotatable hand control switch 32 mounted on the dashboard 18, and another lead 33 connected between the control switch 32 and the wiper motor 27. For independent operation of the wiper motor 27 and thus the wiper system 12, a knob 34 on the control switch 32 is merely rotated between on and off positions.

The pump unit 22 is connected in the electric circuit by means of a lead 36 from the battery 28 to a normally open switch 37 mounted on the pump unit 22. Another lead 38 extends between the switch 37 and the wiper motor 27. For controlling the operation of the pump unit 22, a vacuum control device 39, which consists of a valve structure with an enclosed slide valve (not shown), is attached via a reciprocal rod 41 to the control switch knob 34 for a push-pull movement. The interior of the vacuum control device 39 is in fluid communication through a supply conduit 42 with a source of subatmospheric pressure, such as the intake manifold of the vehicle, and is also in fluid communication with a feed conduit 43 leading to the pump unit 22. A bleed valve 44 is inserted in the feed conduit 43 for a purpose described hereinafter.

Arrangement of the vacuum control device 39 is such, for example, that when the control knob 34 is in the full line position of FIG. 1, the slide valve therein closes off the supply of subatmospheric pressure from the supply conduit 42 to the feed conduit 43. However, when the control knob 34 is pulled outwardly from the dashboard 18 to the dotted line position of FIG. 1, the feed conduit 43 is opened to the supply conduit 42 whereby subatmospheric pressure is applied to the pump unit 22. Rotation of the control knob 34 does not in any way affect the control of the operation of the vacuum control device 39.

Referring particularly to FIGS. 2–6, the pump unit 22 comprises an inverted U-shaped frame 45 attached to a bracket 46 for mounting in the engine compartment of the vehicle. A normally expanded, resilient hollow plastic bellows 47, having a thin wall 48, is mounted on the yoke-like base 49 (FIG. 4) of the frame 45. A T-shaped knob 51 is formed on the bottom of the bellows 47 and is inserted through an elongated opening (not shown) in the base 49. By rotating the bellows 47 approximately 90°, the knob 51 is lockingly engaged with the base 49. A fluid fitting 52 is formed integral with the knob 51, both of which have a bore 50 formed therein for communicating the atmosphere with the interior of the bellows 47, and depends beneath the frame base 49 for attachment to the feed conduit 43 leading to the control device 39. Another T-shaped knob 53 (FIG. 5) is formed on the top of the bellows 47 for similar bayonet-type engagement with a U-shaped drawbar 54 which is part of a movable frame 55.

The movable frame 55 includes further a pair of bolts 56 which are attached at the end of the drawbar 54 and extend upwardly through inwardly turned ends 57 of the frame 45 and outer ends of a plate 59 for securement to the ends of a movable yoke 58. Mounted about the bolts 56 are a pair of springs 63 extended between the frame 45 and the movable yoke 58 for normally biasing the yoke 58 upwardly and away from the stationary frame 45. The plate 59 is connected by fastening devices 62 to the ends 57 of the frame 45 and has a depression 61 formed centrally therein for cradling one end of another bellows 64.

The bellows 64, similar to the vacuum bellows 47, is lockingly engaged to the plate 59 by a T-shaped knob 66 (FIG. 5) formed on its bottom and inserted in bayonet manner through an opening 65 formed in the plate 59. At the top of the bellows 64, a combined T-shaped knob 67 (FIG. 6) and fitting 68 is inserted through a slotted opening 70 for locking engagement with the movable yoke 58. The conduit 21 (FIG. 2) leading from the valve 20 on the reservoir 19 is attached to the fitting 68 for the transmission of fluid therebetween.

The switch 37 includes a switch box 69 mounted on one leg 71 of the stationary frame 45, and which is provided with a vertically movable plunger 72. For coaction with the plunger 72, an actuator 73 in the form of a cam block is mounted on the outer end of an arm 74 secured to the lower end of an adjacent bolt 56.

In the operation of the clearing system of the embodiment of FIGS. 1–6, as mentioned hereinbefore, independent operation of the wiper system 12 is accomplished by rotating the control knob 34 between on-off positions where the electric circuit for the wiper motor 27 is either closed to operate the motor, or is open. For coordinated operation of both wiper and washer systems 12 and 11, respectively, the control knob 34 is pulled from the full line position of FIG. 1 to the dotted line position. This movement of the knob 34 is transmitted through the rod 41 to the vacuum control device 39 to permit the subatmospheric pressure in the supply conduit 42 being applied through the feed conduit 43 to the interior of the normally expanded vacuum bellows 47 (FIG. 2).

By virtue of atmospheric pressure acting on the outside of the bellows 47, it collapses into a contracted position (FIG. 3), and in so doing pulls the drawbar 54, by means of the connection of the upper knob 53, downwardly and toward the base 49 of the stationary frame 45. The downward movement of the drawbar 54 is transmitted by the bolts 56 to the movable yoke 58 which is thus moved in a linear or substantially straight line path laterally of the frame 45 and downwardly against the bias of the springs 63. As the movable yoke 58 moves downwardly toward the stationary frame 45 in response to contraction of the vacuum bellows 47, the fluid bellows 64 is also forced toward a contracted position, thus expelling fluid contained therein outwardly through the conduits 21 and 23 and the valve 20 to the nozzle 24.

Substantially simultaneously with the discharge of fluid from the nozzle 24, the wiper motor 27 is energized to oscillate the wiper blade 26. The switch 37, normally open as the actuator 73 is spaced from the plunger 72, is closed by virtue of the actuator 73 being moved downwardly with the drawbar 54, into engagement with the plunger 72 whereby to close the switch 37 and the circuit for the wiper motor 27.

After both washer and wiper systems 11 and 12, respectively, are operating, the operator releases the control knob 34, which has been held outwardly of the dashboard 18, so that it moves back to its full line position of FIG. 1, the knob 34 being ordinarily spring biased toward that position. This movement closes off the feed conduit 43 from the supply conduit 42 and opens the interior of the vacuum bellows 47 to the atmosphere via the bleed valve 44. As shown in FIG. 10, the valve is of a type which permits air under atmospheric pressure to bleed inwardly thereof and slowly through the supply conduit 43 into the interior of the bellows 47, thereby delaying the expansion of the bellows, even though the fluid bellows 64 has expelled all of the fluid therefrom.

As the vacuum bellows 47 expands from its contracted position shown in FIG. 3, the drawbar 54 is moved upwardly relative to the frame 45, by both the expansion movement of the bellows 47 and the action of the springs 63 against the movable yoke 58. Movement of the yoke 58 away from the frame 45 results in aiding the expansion of the fluid bellows 64 from its contracted position and into its normally expanded position shown in FIG. 2. During this movement of the fluid bellows 64, a suction pressure is created to withdraw a certain quantity of fluid from the reservoir 19 into the interior of the bellows 64. Thus, after the movement to an expanded position, the bellows 64 is recharged with fluid for the next washing cycle.

Due to the delay of expansion of the bellows 47, it may readily be realized that when the bellows 47 expands so as to disengage the actuator 73 from the plunger 72 to open the circuit and stop the wiper motor 27, the operation of the wiper blade 26 across the windshield 13 has continued for a period of time subsequent to the cessation of the delivery of fluid thereagainst. This provides for a time delay in the de-actuation of the wiper system 12 relative to cessation of fluid discharge by the washer system 11. The length of the delay can of course be varied by adjusting the rate at which the valve 44 bleeds air to the bellows 47.

Referring to FIGS. 7–9 inclusive, a modified version of the vehicle windshield clearing system is shown, with like parts being indicated by like numerals. The arrangement is substantially identical with that of FIG. 1 with the exception that a modified vacuum actuated fluid pump unit, indicated generally at 81 in FIG. 7, is provided. The pump unit 81 is fluid connected to the reservoir 19 by the conduit 21, and is also fluid connected to the subatmospheric pressure feed conduit 43 by a pair of conduits 82 and 83.

Referring specifically to FIGS. 8 and 9, the pump unit 81 comprises an elongated stationary frame 84 to which is attached a pair of mounting brackets 86. At each end of the frame 84, a pair of bolts 87 are secured and extend upwardly to mount a movable frame 88 at their upper ends. The movable frame 88, substantially identical to the stationary frame 84, is held in a position spaced away from the stationary frame 84 by means of a pair of springs 89 mounted about the bolts 87 which extend between and are connected to the frames. Centrally of the frames 84 and 88, there is carried a fluid bellows 91 having a pair of T-shaped knobs 92 and 93 at the top and bottom ends thereof for lockingly engaging the bellows to the frames 84 and 88. A fluid fitting 94 is provided at the top of the bellows 91 in combination with the knob 92 for attachment to the conduit 21.

The fluid bellows 91 is positioned between a pair of vacuum bellows 96 and 97 carried between the frames 84 and 88 so that the bellows 96 and 97 are at opposite sides of the bellows 91. A T-shaped knob 98 is provided at the top of each of the vacuum bellows for bayonet-type locking engagement with the movable frame 88, and at the lower end of the bellows 96 and 97, T-shaped knobs and fluid fittings 99 are provided for attachment to the conduits 82 and 83.

In operation, independent control of the wiper motor 27 (FIG. 7) is accomplished in the same way as described for the FIG. 1 embodiment. To operate the fluid pump unit 81 of the washer system 12, the vacuum control knob 34 is pulled from the full line position of FIG. 7 to the dotted line position thereof, thereby admitting subatmospheric pressure through the conduits 43, 82 and 83 to both vacuum bellows 96 and 97. Upon a collapse of the vacuum bellows 96 and 97, the movable frame 88 is pulled downwardly by the knobs 98 toward the stationary frame 84. As the movable frame 88 is pulled toward the stationary frame 84, the fluid bellows 91 is contracted to thereby expel fluid contained therein through the conduit 21 to the nozzle 24 for discharge against the windshield 13.

After the fluid has been expelled through the nozzle 24, by releasing the control knob 34 so that it returns to its full line position in FIG. 7, the subatmospheric pressure is shut off from the interior of the vacuum bellows 96 and 97, and the bleed valve 44 operates to slowly admit air under atmospheric pressure into the bellows 96 and 97. As these bellows expand, they force the movable frame 88 upwardly and away from the stationary frame 84, whereby to also expand the fluid bellows 94. In so expanding, the fluid bellows 94 withdraws fluid from the reservoir 19 through the valve 20 and the conduit 21 so as to recharge the fluid bellows 91 with another supply of fluid.

It should here be noted that whereas coordination between the washer and wiper systems of the FIGS. 1–6 embodiment occurs automatically subsequent to a pull of the control knob 34, coordination of the FIGS. 7–9 embodiment is accomplished manually. That is to say that due to the provision of the switch 37 in the FIGS. 1–6 embodiment, when the control knob 34 is pulled outwardly, the switch 37 turns the wiper motor 27 on in automatic response to contraction of the vacuum bellows 47. However, in the FIGS. 7–9 embodiment, as there is no equivalent to the switch 37, when the knob 34 is pulled outwardly to actuate the washer system 11, the knob 34 must be rotated to close the circuit to the wiper motor 27.

In summation, a windshield clearing system is disclosed including a fluid pump unit having a resilient bellows which is responsive to the application of subatmospheric pressure thereto to effect the collapse of a fluid bellows to expel fluid against the windshield, and wherein, in one embodiment, by providing an electric switch responsive to movement of either of the bellows, operation of the wiper system is directly responsive to operation of the washer system.

Although one embodiment and a modification thereof have been disclosed herein, various alterations and modifications can be made thereto without departing from the scope of the invention as defined by the appended claims.

I claim:

1. A fluid actuated pump comprising:
    (a) first frame means,
    (b) second frame means,
    (c) guide means secured to one of said frame means and slidably positioned in the other frame means to permit lateral movement of one of said frame means relative to the other of said frame means,
    (d) first resilient bellows means extended laterally between and connected to both said frame means, said first bellow means fluid connected to a source of subatmospheric pressure and operable, upon the application and release of said pressure to and from said first bellows means, to move said second frame means laterally relative to said first frame means, and
    (e) second resilient bellows means fluid connected to a source of fluid and extended laterally between and connected to both said frame means, said second bellows means operable in response to said relative lateral movement to withdraw fluid from said fluid source and to expel said withdrawn fluid.

2. A fluid actuated pump comprising:
    (a) stationary first frame means,
    (b) second frame means laterally spaced from said first frame means,
    (c) guide means connected to said first frame means and slidably positioned in said second frame means to permit lateral movement of the second frame means relative to the first frame means,
    (d) first resilient bellows means extended laterally between and connected to both said frame means, said first bellows means fluid connected to a source of subatmospheric pressure and operable, upon the application and release of said pressure to and from said first bellows means, to move said second frame means laterally relative to said first frame means, and
    (e) second resilient bellows means fluid connected to a source of fluid, and extended laterally between and connected to both said frame means, said second bellows means operable in response to said relative lateral movement of said second frame means to withdraw fluid from said fluid source and to expel said withdrawn fluid.

3. A fluid actuated pump comprising:
    (a) stationary first frame means,
    (b) second frame means laterally spaced from said first frame means,
    (c) guide means secured to one of said frame means and slidably positioned in the other frame means to permit lateral movement of one of said frame means relative to the other of said frame means,
    (d) biasing means extended laterally between and engaging said first and second frame means for urging said first and second frame means apart,
    (e) first resilient bellows means extended laterally between and connected to both said frame means, said first bellows means fluid connected to a source of subatmospheric pressure and operable, upon the application and release of said pressure to and from said first bellows means, to move said frame means laterally, relative to said first frame means, and
    (f) second resilient bellows means fluid connected to a source of fluid, and extended laterally between and connected to both said frame means, said second bellows means operable in response to said relatively lateral movement of said frame means to withdraw fluid from said fluid source and to expel said withdrawn fluid.

4. A windshield clearing system comprising:
    (a) a wiper unit having a wiper blade and an electric motor for operating said wiper blade,
    (b) a washer unit including a liquid reservoir and a nozzle,
    (c) a fluid actuated pump unit for supplying liquid under pressure to said nozzle, said pump unit including
    (d) first frame means and
    (e) second frame means,
    (f) guide means secured to one of said frame means and slidably positioned in the other frame means to permit relative lateral movement of said frame means,
    (g) first and second resilient bellows means connected to and extended laterally between said frame means, said first bellows means fluid connected to a source of subatmospheric pressure and operable, upon the application and release of said pressure to and from said first bellows means, to provide lateral movement between said first and second frame means, said second bellows means fluid connected to said reservoir and said nozzle for withdrawing, upon expansion, liquid therefrom and for expelling, upon contraction, said liquid through said nozzle, and
    (h) switch means for connecting said electric motor to an electric source, said switch means having an actuating member connected to the movable frame means for controlling the operation of said motor relative to the operation of said pump unit.

5. The windshield clearing system defined in claim 4 including:
    (a) a control valve unit for selectively applying a source of subatmospheric pressure to said first bellows and a source of electric current to said electric motor independently of said switch means.

6. The windshield clearing system defined in claim 4 including:
  (a) means for bleeding atmospheric pressure into said first bellows means whereby to delay the movement thereof to maintain said motor operating after the contraction of said second bellows means.

References Cited in the file of this patent
UNITED STATES PATENTS

| | | |
|---|---|---|
| 2,970,335 | Webb | Feb. 7, 1961 |
| 3,000,033 | Webb | Sept. 19, 1961 |
| 3,017,650 | Schaal | Jan. 23, 1962 |